United States Patent
Li et al.

(10) Patent No.: US 7,212,908 B2
(45) Date of Patent: May 1, 2007

(54) SYSTEM AND METHOD FOR REDUCING COMPRESSION IGNITION ENGINE EMISSIONS

(75) Inventors: Xiaobin Li, Livonia, MI (US);
Zornitza Pavlinova Pavlova-MacKinnon, Farmington Hills, MI (US); Adedejo Bukola Oladipo, Canton, MI (US); Rakesh Aneja, Farmington Hills, MI (US)

(73) Assignee: Detroit Diesel Corporation, Detroit, MI (US)

( * ) Notice: Subject to any disclaimer, the term of this patent is extended or adjusted under 35 U.S.C. 154(b) by 58 days.

(21) Appl. No.: 11/225,757

(22) Filed: Sep. 13, 2005

(65) Prior Publication Data

US 2007/0056554 A1  Mar. 15, 2007

(51) Int. Cl.
*B60T 7/12* (2006.01)
*F02M 25/07* (2006.01)

(52) U.S. Cl. ........................ 701/108; 123/568.11

(58) Field of Classification Search ............ 701/101, 701/103, 108; 123/568.11, 568.21, 568.31; 60/274, 285, 287, 297
See application file for complete search history.

(56) References Cited

U.S. PATENT DOCUMENTS

| | | | |
|---|---|---|---|
| 5,069,185 A | 12/1991 | Evasick | |
| 6,178,942 B1 | 1/2001 | di Priolo et al. | |
| 6,230,683 B1 | 5/2001 | zur Loye et al. | |
| 6,276,334 B1 | 8/2001 | Flynn et al. | |
| 6,640,773 B2 | 11/2003 | Ancimer et al. | |
| 6,679,224 B2 | 1/2004 | Stanglmaier | |
| 6,782,737 B2 | 8/2004 | Wright | |
| 2003/0226528 A1 | 12/2003 | Yamaoka et al. | |
| 2005/0039439 A1* | 2/2005 | Kitahara | 60/274 |
| 2005/0150213 A1* | 7/2005 | Miyazaki et al. | 60/287 |
| 2006/0196165 A1* | 9/2006 | Otsubo et al. | 60/274 |
| 2006/0213188 A1* | 9/2006 | Matsuno et al. | 60/286 |

OTHER PUBLICATIONS

B. Bolton et al., Breakthrough Diesel Engine Technology—to Meet Tier 2 and CO2 Emissions Reduction, 7th DEER Workshop, 2001, 28 pages.

* cited by examiner

*Primary Examiner*—John T. Kwon
(74) *Attorney, Agent, or Firm*—Brooks Kushman P.C.

(57) ABSTRACT

A method of reducing nitrogen oxides (NOx) and particulate matter (PM) in compression ignition engine emissions. The method includes monitoring at least one engine sensor that generates a signal in response to at least one engine operating condition, and adjusting at least one engine control parameter in response to the signal such that in-cylinder spacial distribution of equivalence ratio and temperature is substantially maintained to an operating region. The operating region corresponds to a set of equivalence ratio with respect to temperature values that are substantially outside regions supportive of NOx and PM formation. The temperature values are greater than 1650 K, and the equivalence ratio values are greater than 0.5.

20 Claims, 6 Drawing Sheets

SYSTEM AND METHOD FOR REDUCING COMPRESSION IGNITION ENGINE EMISSIONS

STATEMENT REGARDING FEDERALLY SPONSORED RESEARCHED OR DEVELOPMENT

The invention was made with Government support under Contract No. DE-FC05-97-OR22606. The Government has certain rights to the invention.

BACKGROUND OF THE INVENTION

1. Field of the Invention

The present invention relates to a system and method for reducing emissions of nitrogen oxides (NOx) and particulate matter (PM) in a compression ignition engine.

2. Background Art

Internal combustion engines, and in particular, compression ignition (or diesel) engines have a wide variety of applications including passenger vehicles, marine vessels, earth-moving and construction equipment, stationary generators, and on-highway trucks, among others. Such applications typically have a variety (e.g., light, medium, and heavy) of operating conditions (i.e., engine modes).

When the temperature of the engine combustion chamber exceeds a particular temperature in relation to the air/fuel equivalence ratio, oxides of nitrogen (i.e., nitrogen oxides, NOx) and particulate matter (PM) may be generated as byproducts of the combustion process. NOx and PM are generally considered undesirable pollutants and, in particular, are typically believed to be factors in the formation of smog.

Referring to FIG. 1, a diagram 10 illustrating published data indicating local temperature and local equivalence ratios that are known to promote formation of NOx (i.e., region 106) and PM (i.e., region 104) in diesel engines is shown. The diagram 10 further shows a Low Temperature High Equivalence Ratio Combustion region (LTHE) 12, and a Low Temperature Low Equivalence Ratio region (LTLE) 14. The LTHE region 12 is characterized by in-cylinder temperatures in the range of 1000 K to 1650 K, and combustion equivalence ratios in the range of 0 to 8. The LTLE region 14 is characterized by in-cylinder temperatures in the range of 1000 K to 2000 K, and combustion equivalence ratios in the range of 0 to 0.5. Conventional approaches to limiting the formation of NOx and PM have focused on operating the engine within regions 12 or 14, or a combination of regions 12 and 14. While an engine operating within either the LTHE 12 or LTLE 14 regions may produce low NOx and PM emissions, such operation has the deficiency of limiting the engine to light load applications. Furthermore, operating within regions 12 or 14 may also produce excessive penalties in fuel consumption and in hydrocarbon and carbon monoxide emissions.

Therefore, it would be desirable to have a system and method for reducing the formation of NOx and PM for compression ignition combustion engines that reduces or overcomes the deficiencies of conventional approaches.

SUMMARY OF THE INVENTION

The present invention generally provides new, improved, and innovative techniques for reducing the formation of nitrogen oxides (i.e., oxides of nitrogen, NOx) and particulate matter (i.e., PM) during compression ignition combustion wherein the engine is operating under medium or heavy load conditions in addition to light load conditions. Furthermore, the present invention may enhance the effectiveness of conventional post-combustion emission treatment devices (i.e., after-treatment devices).

According to the present invention, a method of reducing nitrogen oxides (NOx) and particulate matter (PM) in compression ignition engine emissions is provided. The method comprises monitoring at least one engine sensor, wherein the at least one engine sensor generates a signal in response to at least one engine operating condition, and adjusting at least one engine control parameter in response to the signal such that in-cylinder spacial distribution of equivalence ratio and temperature is substantially maintained to an operating region. The operating region corresponds to a set of equivalence ratio with respect to temperature values that are substantially outside regions supportive of NOx and PM formation. The temperature values are greater than 1650 K, and the equivalence ratio values are greater than 0.5.

Also according to the present invention, a system for reducing nitrogen oxides (NOx) and particulate matter (PM) in vehicle emissions, the vehicle having a compression ignition internal combustion engine, is provided. The system comprises an exhaust gas recirculation (EGR) valve installed on the engine and having an actuator for adjusting EGR flow rate through the EGR valve in response to an EGR rate control signal, a fuel injector valve installed on the engine and having an actuator configured to adjust fuel flow through the fuel injector valve in response to a fuel injector control signal, a first sensor for determining engine speed, a second sensor for determining engine torque, a third sensor for determining vehicle speed, and an engine control module (ECM). The ECM is in electrical communication with the EGR valve actuator, the fuel injector valve actuator, the first sensor, the second sensor, and the third sensor. The ECM determines the EGR rate control signal and the fuel injector control signal in response to at least one signal presented by at least one of the first sensor, second sensor, and third sensor such that in-cylinder spacial distribution of equivalence ratio and temperature is substantially maintained to an operating region. The operating region corresponding to a set of equivalence ratio with respect to temperature values that are substantially outside regions supportive of NOx and PM formation. The temperature values are greater than 1650 K, and the equivalence ratio values are greater than 0.5.

Further, according to the present invention, a controller for controlling exhaust nitrogen oxides (NOx) and particulate matter (PM) emissions from a compression ignition internal combustion engine is provided. The controller comprises a first output port that presents a first control signal to an exhaust gas recirculation (EGR) valve installed on the engine and having an actuator configured to adjust EGR flow rate through the EGR valve in response to the first control signal, a second output port that presents a second control signal to an EGR cooler installed on the engine and having an actuator configured to adjust EGR flow through the EGR cooler in response to the second control signal, a third output port that presents a third control signal to a fuel injector valve installed on the engine and having an actuator configured to adjust fuel flow through the fuel injector valve in response to the third control signal, a first input port that receives a first sensor signal from a respective sensor for determining engine speed, a second input port that receives a second sensor signal from a respective sensor for determining engine torque; and a third input port that receives a third sensor signal from a respective sensor for determining vehicle speed. The controller is in electrical communication with the EGR valve actuator, the EGR cooler actuator, the fuel injector valve actuator, the sensor for determining engine speed, the sensor for determining engine torque, and the sensor for determining vehicle speed. The controller determines at least one of the first control signal, second control signal, and third control signal such that in-cylinder spacial distribution of equivalence ratio and temperature is substantially maintained to an operating region. The operating region corresponding to a set of equivalence ratio with respect to temperature values that are substantially outside regions supportive of NOx and PM formation. The temperature values are greater than 1650 K, and the equivalence ratio values are greater than 0.5.

DETAILED DESCRIPTION OF THE PREFERRED EMBODIMENT(S)

With reference to the Figures, the preferred embodiments of the present invention will now be described in detail. Generally, the present invention provides an improved system and an improved method for controlling (e.g., reducing, limiting, minimizing, optimizing, etc.) the formation of nitrogen oxides (i.e., oxides of nitrogen, NOx) and particulate matter (PM) during a compression ignition combustion process when the engine is operating under medium or heavy load conditions in addition to light load conditions.

The range of operation of the present invention is generally broad. In one example, the range of operation includes engine speeds of 600 RPM to 4000 RPM and loads up to 8 bar brake mean effective pressure (BMEP). Furthermore, the present invention may enhance the effectiveness of conventional post-combustion emission treatment devices (i.e., after-treatment devices) by providing higher exhaust temperatures, enhanced control of carbon monoxide (CO) and hydrocarbon (HC) emissions, and higher fractions of nitrogen dioxide ($NO_2$) species in the overall NOx emissions, as compared to conventional approaches.

Figure 2:
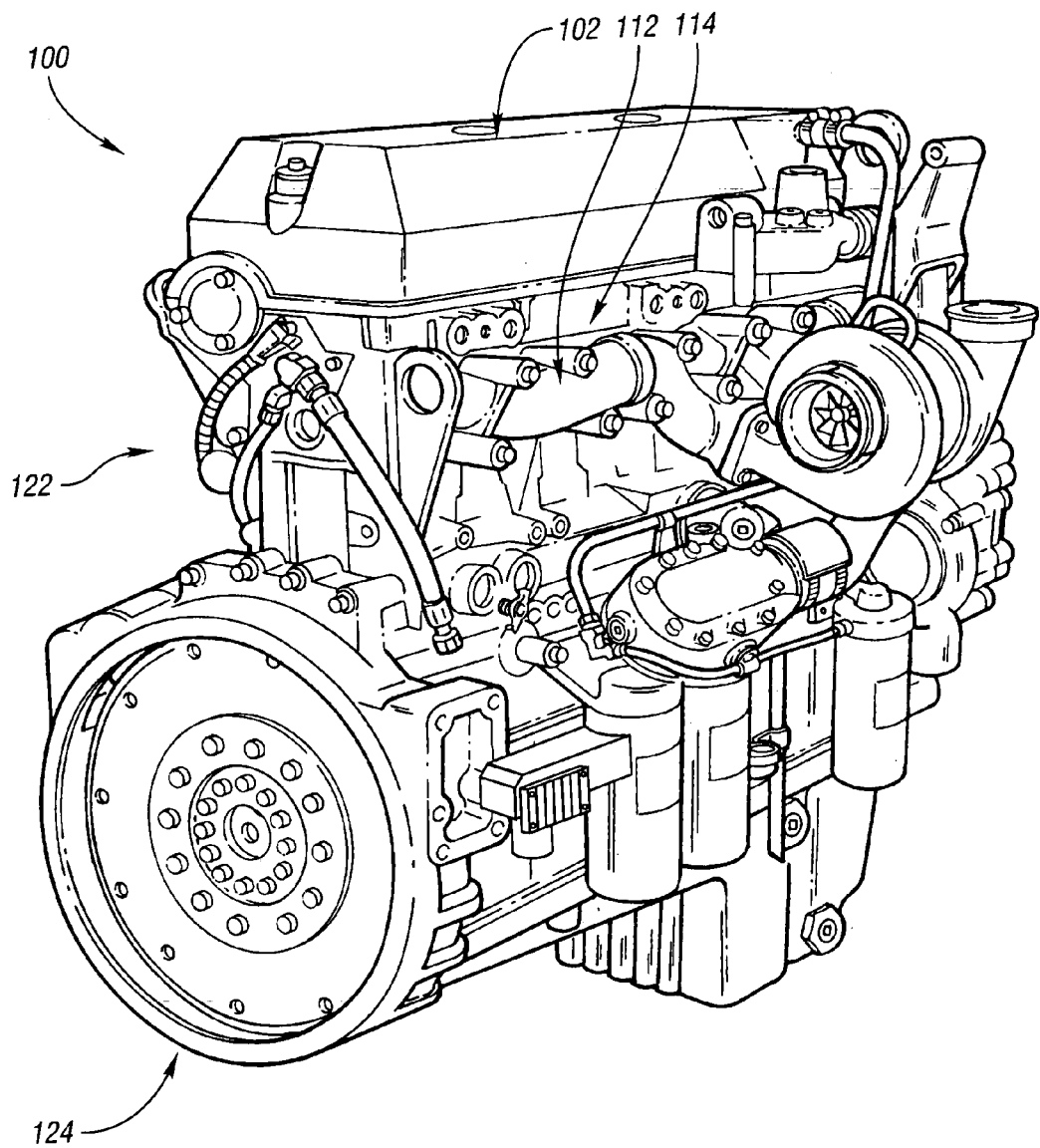
FIG. 2 is a perspective view illustrating a compression ignition engine incorporating various features of the present invention.

Referring to FIG. 2, a perspective view illustrating a compression-ignition internal combustion engine 100 incorporating various features according to the present invention is shown. The engine 100 may be implemented in a wide variety of applications including on-highway trucks, construction equipment, marine vessels, stationary generators, pumping stations, and the like. The engine 100 generally includes a plurality of cylinders having a piston disposed below a corresponding cover, indicated generally by reference numeral 102.

In one embodiment, the engine 100 is a multi-cylinder compression ignition internal combustion engine, such as a 3, 4, 6, 8, 12, 16, or 24 cylinder diesel engine. However, the engine 100 may be implemented having any appropriate number of cylinders 102 to meet the design criteria of a particular application.

An exhaust gas recirculation (EGR) valve (shown as element 110 in FIG. 3) is generally connected between an exhaust manifold 112 and an intake manifold 114. The EGR valve 110 generally provides recirculation of a portion of exhaust gas in response to at least one predetermined engine 100 operating condition. The EGR valve 110 is generally implemented as a variable flow device.

The engine 100 generally includes an engine control module (ECM), powertrain control module (PCM), or other appropriate controller 120 (shown and described in detail in connection with FIG. 3). The ECM 120 generally communicates with various engine sensors and actuators via associated interconnection cabling (i.e., leads, wires, connectors, etc.) 122, to control the engine 100. In addition, the ECM 120 generally communicates with an engine operator or user (not shown) using associated lights, switches, displays, and the like (not shown).

In one example, the engine 100 may be mounted (i.e., installed, implemented, positioned, disposed, etc.) in a vehicle (not shown). In another example, the engine 100 may be installed in a stationary environment. The engine 100 may be coupled to a transmission (not shown) via flywheel 124. Many transmissions include a power take-off (PTO) configuration where an auxiliary shaft (not shown) may be connected to associated auxiliary equipment (not shown). However, the present invention is independent of the particular implementation of the engine 100, or whether the vehicle is stationary or moving for the applications in which the engine 100 is used in a vehicle having a PTO mode. The loads presented to the engine 100/transmission in a stationary configuration may be relatively constant or may vary.

Figure 3:
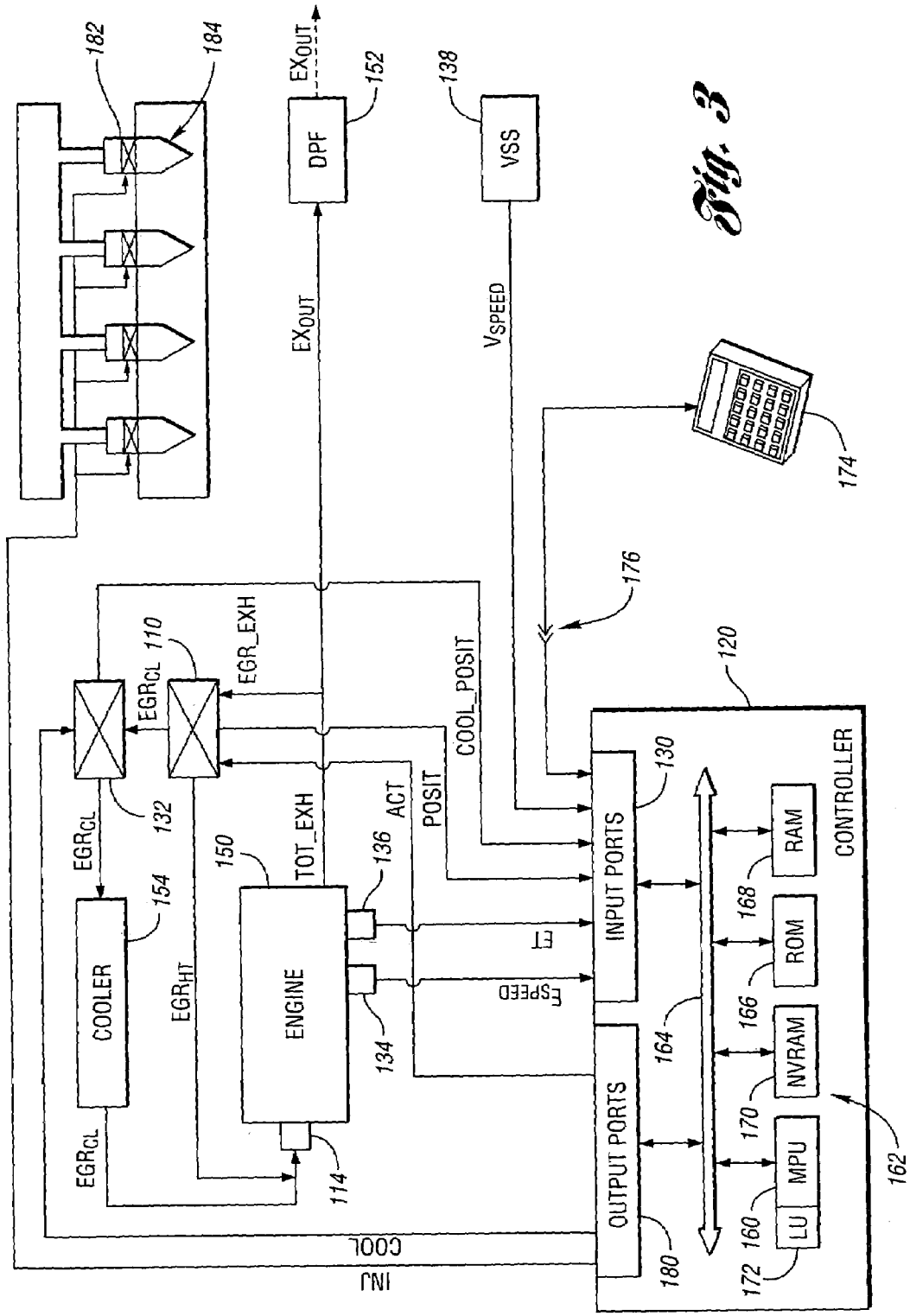
FIG. 3 is a schematic diagram of an internal combustion engine and engine control system of the present invention.

Referring to FIG. 3, the internal combustion engine 100 and associated control system (or controller) 120 and subsystems are shown. Various sensors and switches (not shown) are generally in electrical communication with (i.e., are connected or coupled to) the controller 120 via input ports 130. The sensors may include various position sensors such as an accelerator or brake position sensor. Likewise, the sensors may include a coolant temperature sensor that generally provides an indication of the temperature of an engine block and an intake manifold air temperature sensor that generally provides an indication of the temperature of the engine intake air at the inlet or within the intake manifold 114.

Other sensors may include at least one sensor that indicates actuation (e.g., position, percentage of open, mass flow through etc.) of an EGR control valve 110. The EGR control valve 110 generally includes an actuator that opens and closes the EGR valve 110 an amount (i.e., level, to a position, etc.) that corresponds to (i.e., in response to) a control signal (e.g., ACT), and a sensor that generates a position signal (e.g., POSIT) that corresponds to (i.e., in response to) the amount of opening (or closing) of the EGR control valve 110.

Furthermore, the controller 120 may communicate with at least one sensor that indicates actuation of an EGR cooling valve 132 (e.g., via a signal COOL_POSIT), at least one sensor that indicates the rotational speed of the engine 100 (e.g., a sensor 134 via a signal ESPEED), and at least one sensor that indicates the engine 100 torque (e.g., a sensor 136 via a signal ET).

Similarly, the other sensors may include a vehicle speed sensor 138 (VSS). The VSS 138 generally provides an indication of the rotational speed (e.g., via a signal VSPEED) of the output shaft (not shown) of the transmission. The speed of the shaft monitored via the VSS 138 may be used to calculate the vehicle speed. The VSS 138 may also represent one or more wheel speed sensors which may be used in anti-lock breaking system (ABS) applications, vehicle stability control systems, and the like.

The engine 100 generally has an exhaust manifold port (e.g., outlet) 150 for discharging combustion exhaust (e.g., TOT_EXH). A portion of TOT_EXH may be presented to the EGR valve 110 (e.g., a portion EGR_EXH). The remainder of the exhaust gas (i.e. a portion EXOUT) may pass through an exhaust system that includes a diesel particulate filter (DPF) 152. The DPF 152 is one example of a post-combustion emission treatment device that reduces the PM in gases exhausted from the vehicle.

Likewise, a portion EGRCL of the exhaust presented to the EGR valve 110 (i.e., the portion EGR_EXH) may be presented to the ERG cooling valve 132 and the remainder of the portion EGR_EXH (e.g., a portion EGRHT) may be presented to the intake manifold 114 of the engine 100. The EGR cooling valve 132 is generally implemented as a variable flow device. The variable flow device generally includes an actuator that opens and closes the EGR cooling valve 132 an amount (i.e., level, to a position, etc.) that corresponds to (i.e., in response to) a control signal (e.g., COOL), and a sensor that generates a position signal (e.g., COOL_POSIT) that corresponds to (i.e., in response to) the amount of opening (or closing) of the EGR cooling valve. By varying the actuator, the amount of EGR gas sent to a cooling system 154 may be adjusted.

The portion EGRCL may be passed through the cooler 154 to reduce the temperature of the exhaust gas flow prior to reintroduction to the engine 100 via the intake manifold 114. The cooler 154 may contain a heat exchanger to facilitate the transfer of heat from the exhaust gas to a coolant (e.g., engine coolant). Accordingly, any desired quantity of EGR gas (i.e., any desired quantity of the portion EGR_EXH) may be cooled prior to entering the intake manifold 114.

The controller 120 preferably comprises a programmable microprocessor 160 in communication with (i.e., coupled to) various computer readable storage media 162 via at least one data and control bus 164. The computer readable storage media 162 may include any of a number of devices such as read only memory (ROM) 166, random access memory (RAM) 168, and non-volatile (keep-alive) random access memory (NVRAM) 170.

The various types of computer-readable storage media 162 may generally provide short-term and long-term storage of data (e.g., at least one lookup table, LUT, at least one operation control routine, at least one mathematical model for EGR control, at least one mathematical model for EGR cooling control, at least one mathematical model for fuel injection timing control, etc.) used by the controller 120 to control the engine 100, and, in particular, the EGR valve 110, the EGR cooling valve 132, and fuel injection solenoids 182). The computer-readable storage media 162 may be implemented by any of a number of known physical devices capable of storing data representing instructions executable by the microprocessor 160. Such devices may include PROM, EPROM, EEPROM, flash memory, and the like in addition to various magnetic, optical, and combination media capable of temporary and permanent data storage.

The computer-readable storage media 162 may include data representing program instructions (e.g., software), calibrations, routines, steps, methods, blocks, operations, operating variables, and the like used in connection with associated hardware to control the various systems and subsystems of the engine 100, the EGR valve 110, the EGR cooling valve 132, the fuel injection solenoids 182, and the vehicle. The engine/vehicle/EGR/fuel injection system control logic is generally implemented via the controller 120 based on the data stored in the computer-readable storage media 162 in addition to various other electric and electronic circuits (i.e., hardware, firmware, etc.).

The computer readable storage media 162 generally have instructions stored thereon that may be executable by the controller 120 to control the internal combustion engine 100, including the EGR valve 110, the EGR cooling valve 132, and the fuel injection solenoids 182. The program instructions may direct the controller 120 to control the various systems and subsystems of the vehicle where the engine 100 is implemented, with the instructions being executed by microprocessor 160, and optionally, instructions may also be executed by any number of logic units 172. The input ports 130 may receive signals from the various sensors and switches, and the controller 120 may generate signals (e.g., the signals ACT, COOL, and INJ) at output ports 180. The output signals are generally presented (or transmitted) to the various vehicle components (e.g., the EGR valve 110 actuator, the EGR cooling valve 132 actuator, the fuel injection solenoids 182, other actuators, indicators, and the like).

The actuators may include various engine components which are operated via associated control signals from the controller 120. The various actuators may also provide signal feedback to the controller 120 relative to the actuator operational state (e.g., via a respective sensor), in addition to feedback position or other signals used to control the actuators. The actuators preferably include a plurality of fuel injectors 184 which are controlled via associated (or respective) solenoids (e.g., the solenoids 182) to deliver fuel to the corresponding cylinders 102 in response to a signal (e.g., the signal INJ). The actuators may also include at least one actuator that may be implemented to control the EGR valve 110 in response to a signal (e.g., the signal ACT), and at least one actuator to control the EGR cooling valve 132 in response to a signal (e.g., the signal COOL).

A data, diagnostics, and programming interface 174 may also be selectively connected to the controller 120 via a bus and connector 176 to exchange various information there between. The interface 174 may be used to change values within the computer readable storage media 162, such as configuration settings, calibration variables, instructions for EGR, EGR cooling, and engine control, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 174 selectively connected via an appropriate plug or connector 176 to the controller 120. Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 120 may receive signals from the various vehicle sensors and switches, and execute control logic embedded in hardware and software to control the engine 100, the EGR valve 110, the EGR cooling valve 132, the fuel injection solenoids 182, and the like. In one example, the controller 120 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 120, in addition to and by any of the various systems and subsystems of the vehicle or other installation where the controller 120 is implemented. Yet further, although in one embodiment, the controller 120 includes the microprocessor 160, any of a number of known programming and processing techniques, algorithms, steps, bocks, processes, routines, strategies and the like may be implemented to control the engine 100, the EGR valve 110, the EGR cooling valve 132, and the fuel injection solenoids 182 in accordance with the present invention. Further, the engine controller 120 may receive information in a variety of ways. For example, engine 100 systems information may be received over a data link, at a digital input, or at a sensor input of the engine controller 120.

In accordance with one embodiment of the present invention, the EGR valve 110 and EGR cooling valve 132 comprise variable flow valves that are electronically controlled by the controller 120. There may be many possible configurations for a controllable valve, and embodiments of the present invention are not limited to any particular structure for the EGR valve 110 and EGR cooling valve 132. Further, various sensors located at the EGR valve 110, the EGR cooling valve 132, on the engine 100, and in connection with corresponding systems, subsystems, and components may detect temperature and differential pressure to provide for determination of the exhaust gas mass flow rate through the EGR valve 110 and the EGR cooling valve 132 via the controller 120.

Embodiments of the present invention include control logic that processes various input signals representing various engine (or component, system, subsystem, etc.) conditions, and in turn, provides at least one EGR command (or control) signal (e.g., ACT), at least one EGR cooling command (or control) signal (e.g., COOL), and at least one fuel injection command (or control) signal (e.g., INJ). The EGR command (or control) signal ACT generally controls a position of the variable flow EGR valve 110 to control gas flow through the EGR exhaust gas flow path 180. The EGR position sensor generally presents a signal (e.g., POSIT) to at least one of the input ports 130. The position signal POSIT generally corresponds to (i.e., is related to) the position (e.g., percentage of opening or closing) of the EGR valve 110. The EGR cooling command (or control) signal COOL generally controls a position of the variable flow EGR cooling valve 132 to control gas flow through the EGR exhaust cooling gas flow path 182. The EGR cooling position sensor generally presents a signal (e.g., COOL_POSIT) to at least one of the input ports 130. The position signal COOL_POSIT generally corresponds to (i.e., is related to) the position (e.g., percentage of opening or closing) of the EGR cooling valve 132. The fuel injection command (or control) signal INJ is generally implemented in conjunction with the solenoids 182 to control the quantity, timing, and duration of fuel injections during a combustion cycle.

While the representative engine and control system 100 illustrates an example application environment of the present invention the present invention is not limited to any particular type of fuel or fueling system and thus may be implemented in any appropriate engine and/or engine system to meet the design criteria of a particular application.

Figure 1:
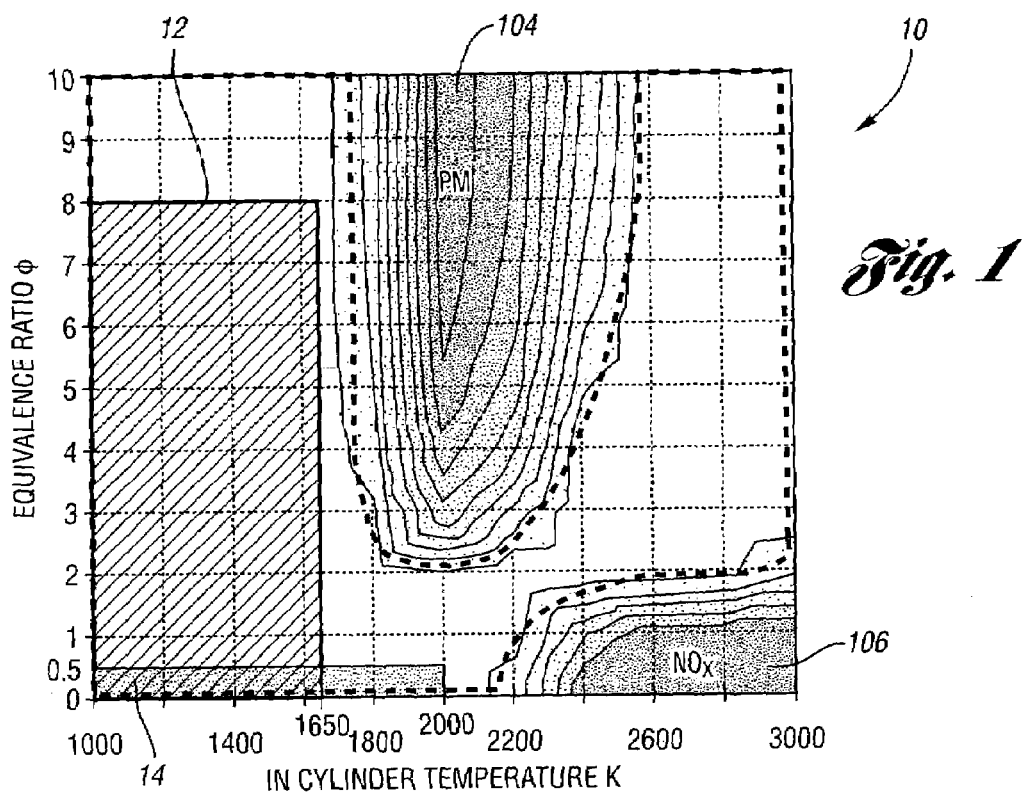
FIG. 1 is a diagram illustrating local temperature and local equivalence ratios known to promote formation of NOx and PM.

As discussed in conjunction with FIG. 1, a reduction of NOx and PM may be generally characterized by a low equivalence ratio coupled with a low combustion temperature. As shown in detail in FIG. 4, operating an engine 100 at medium or heavy loads while maintaining the reduction in NOx and PM may be generally characterized by equivalence ratio and temperature values substantially within the predetermined equivalence ratio versus temperature region 202. For convenience of description, region 202 may be referred to as the "ideal domain of temperature and equivalence ratio" region (IDTE).

In general, the controller 120 maintains engine 100 in-cylinder temperatures and equivalence ratios to a point within at least one of the LTHE region 12, the LTLE region 14, and the IDTE region 202 by adjusting at least one of fuel injection timing, EGR rate, and EGR cooling. In particular, the controller 120 may generate at least one of the output signals INJ, ACT, and COOL in response to at least one of the input signals ESPEED, ET, VSPEED, POSIT, and COOL_POSIT such that the engine 100 operates (i.e., exhibits an equivalence ratio and cylinder temperature) substantially within region 12, region 14, and/or region 202.

In one embodiment, at least one of the input signals ESPEED, ET, and VSPEED may be referenced to a look up table stored in the computer-readable storage media 162 to determine at least one of the signals INJ, ACT, and COOL. In another embodiment, at least one of the input signals ESPEED, ET, and VSPEED may be implemented in a mathematical model (i.e., mathematical algorithm) stored in the computer-readable storage media 162 to determine at least one of the signals INJ, ACT, and COOL. However, any available input signal may be used with any appropriate control model to establish an output signal to meet the design criteria of a particular application.

The controller 120 may generate the signal INJ such that fuel injection timing is maintained within a range of ten degrees Before Top Dead Center (BTDC) and fifteen degrees After Top Dead Center (ATDC). However, the controller 120 may generate the signal INJ such that fuel injection timing is maintained within any appropriate range such that the combustion temperature and equivalence ratio are substantially maintained to a point within the LTHE 12, LTLE 14, and/or IDTE 202 regions.

The controller 120 may generate the signal ACT such that the EGR rate is maintained at or below fifty percent. However, the controller 120 may generate the signal ACT such that the EGR rate is maintained within any appropriate range such that the combustion temperature and equivalence ratio are substantially maintained to a point within the LTHE 12, LTLE 14, and/or IDTE region 202.

In general, the controller 120 may determine at least one of the output signals (e.g., the signals INJ, ADJ, and COOL) such that the engine in-cylinder temperature is reduced over a period of time. The controller 120 may also determine at least one of the output signals such that the homogeneity of the air/fuel mixture is increased over time. Similarly, the controller 120 may determine at least one of the output signals such that the combustion ignition is delayed over time.

Figure 4:
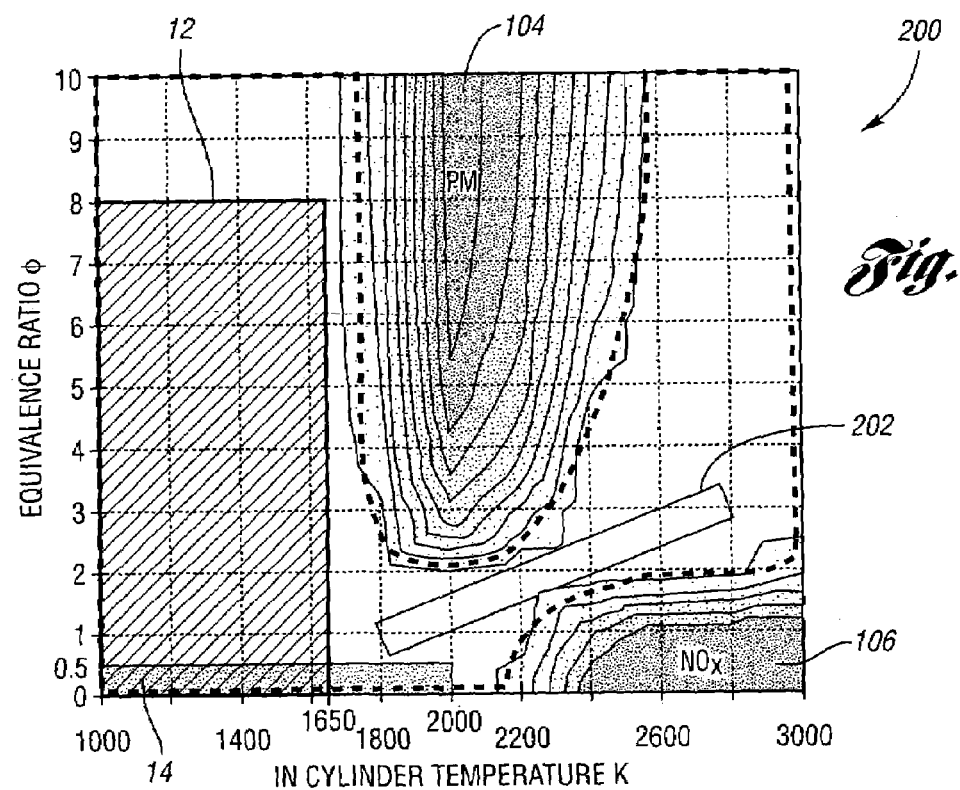
FIG. 4 is a combustion equivalence ratio versus temperature plot illustrating the IDTE region in relation to the LTHE and LTLE regions.

Referring to FIG. 4, an equivalence ratio versus temperature plot 200 illustrating the IDTE region 202 in relation to the regions LTHE 12 and LTLE 14 is shown. The region 202 corresponds to equivalence ratio/temperature values that are generally supportive of operating an engine 100 at medium and heavy loads while combustion is substantially outside NOx supportive regions 206 and PM formation regions (i.e., soot regions) 204. In one embodiment, the IDTE region 202 may be predetermined as a set of equivalence ratio with respect to temperature values that are substantially outside regions supportive of NOx and PM formation, and having temperature values greater than 1650 K and equivalence ratio values greater than 0.5. In another embodiment, the IDTE region 202 may be predetermined as a set of equivalence ratio with respect to temperature values that are substantially outside regions supportive of NOx and PM formation, and having temperature values greater than 1800 K and equivalence ratio-values greater than 0.5. However, the IDTE region 202 may be predetermined as any set or subset of equivalence ratio with respect to temperature values that are substantially outside regions supportive of NOx and PM, and outside of the LTHE 12 and LTLE 14 regions.

In general, cylinder combustion temperature may be modified (i.e., adjusted, determined, set, manipulated, etc.) by adjusting at least one of fuel injection timing, EGR rate, EGR cooling, and compression ratio. When fuel injection occurs late in a combustion cycle (i.e., delayed fuel injection timing), the volume of the combustion cylinder 102 is generally greater due to the motion of the piston retracting. The increased volume may facilitate lower cylinder temperatures because there is more room for energy to disperse.

Similarly, increasing the EGR rate generally results in a reduction in the amount of oxygen (i.e., $O_2$) available for combustion within each cylinder 102. The fuel/air mixture may burn at a lower temperature when $O_2$ is reduced when compared with combustion having unlimited $O_2$. In addition, the introduction of the exhaust gases increase the heat capacity of the in-cylinder mass. The increased heat capacity allows for greater absorption of the energy produced during combustion such that increases in temperature are limited. In general, an EGR rate of fifty percent or less may be maintained to ensure that sufficient $O_2$ is present to support the desired air/fuel mixture combustion. However, any EGR rate may be maintained to satisfy the design criteria of a particular application.

The EGR gas may be cooled before introduction into a cylinder 102. Cooled EGR gases generally act to reduce the internal cylinder temperature through heat transfer from the cylinder to the cooler recirculated gases.

Furthermore, lowering the compression ratio (i.e., the ratio of the cylinder volume when the piston is at the bottom of the stroke to the volume of the cylinder when the piston is at the top of the stroke) of a cylinder 102 generally supports low cylinder temperature combustion due to the resulting decrease in the pressure exerted on the air/fuel mixture. As one skilled in the art would recognize, a decrease in pressure exerted on a contained gas results in a decreased temperature for the gas.

The reduced cylinder temperature resulting from the modification of the at least one of fuel injection timing, EGR rate, EGR cooling, and compression ratio during a combustion cycle may, in turn, support delayed combustion during successive combustion cycles. Delayed combustion generally results from the additional time required for the air/fuel mixture to reach flash point (i.e., the temperature at which the air/fuel mixture spontaneously ignites) due to the lower initial cylinder temperature. As previously discussed with regard to delayed fuel injection timing, delaying combustion until late in the combustion cycle generally supports low temperature combustion because the volume of the combustion cylinder is generally greater as a result of the piston retracting.

In general, equivalence ratio (i.e., $\Phi$) may be defined as:

$$\Phi = \alpha/\beta$$

where:
$\alpha$=the actual air/fuel ratio on a mass basis for the charge in the engine combustion chamber.
$\beta$=the stoichiometric air/fuel ratio on a mass basis that would theoretically provide the amount of oxygen required for complete combustion of all carbon and hydrogen in the fuel.

When $\Phi$ is greater than one, a homogeneous air/fuel mixture is generally said to be lean because there is more oxygen than required to provide complete combustion. In contrast, when $\Phi$ is less than one, a homogeneous air/fuel mixture is generally said to be rich because there is not enough oxygen for complete combustion.

When the air/fuel mixture is not substantially homogeneous, the equivalence ratio requirement may increase due to the additional quantity of air required to insure combustion. Accordingly, insuring that an air/fuel charge is substantially homogeneous prior to combustion generally lowers the equivalence ratio required to achieve a given level of combustion.

In general, air/fuel homogeneity may be influenced by the level of swirl within the cylinders, fuel injection pressure, fuel injection timing, EGR rate, EGR cooling, and compression ratio.

As previously discussed, fuel injection timing, EGR rate, EGR cooling, and compression ratio may be manipulated to reduce the in-cylinder temperature. The reduced in-cylinder temperature generally supports delayed combustion due to the additional time required for the air/fuel mixture to reach flash point. The additional time allows for greater mixing (i.e. increased homogeneity) of the air/fuel mixture prior to combustion. Accordingly, the manipulation of fuel injection timing, EGR rate, EGR cooling, and compression ratio may also be utilized to reduce the equivalence ratio.

In general, increasing the fuel injection pressure increases the ability of the fuel to mix with the combustion air. Furthermore, the increased pressure may reduce the time taken to complete the fuel injection process resulting in additional time for mixing the fuel and air prior to combustion. In one particular embodiment, fuel injection pressure modulated on the order of five-hundred bar to twenty two-hundred bar provides increased mixing of fuel and combustion air such that greater air/fuel homogeneity and a reduced equivalence ratio are realized.

Furthermore, increasing the level of swirl within a combustion cylinder generally increases the homogeneity of the air/fuel mixture. Once again, the increased homogeneity may result in a reduced equivalence ratio. The level of swirl within the combustion cylinder 102 may be increased by implementing any appropriate intake port design, piston bowl shape, and flow tip configuration to meet the design criteria of a particular application. However, increasing the swirl level through intake port design may decrease engine fuel economy as a result of increased flow coefficients. Accordingly, embodiments of the present invention may implement low or moderate levels of intake-port generated swirl while maintaining a reduction in NOx and PM.

Any residual NOx and PM emissions may be removed by conventional post-combustion emission treatment devices (e.g., diesel particulate filter (DPF), selective catalytic reduction (SCR), and the like). The effectiveness of post-combustion treatment devices may be enhanced by elevating the temperature of the exhaust gases and regulating levels of CO and HC in the exhaust stream. In general, delaying the timing of fuel injection events and reducing the equivalence ratio as implemented by embodiments of the present invention generally yields lower in-cylinder temperatures while providing higher engine exhaust temperatures in comparison with conventional diesel combustion. Furthermore, CO and HC levels may be adjusted to any appropriate level to satisfy the design criteria of a particular application by controlling the number and timing of fuel injection events during a combustion cycle. Application of multiple fuel injection events generally produces lower CO and HC levels by using a portion of the injected fuel to prepare the in-cylinder conditions and to act as a stabilizer for the remainder of the fuel such that the combustion process is fully supported.

Figure 5:
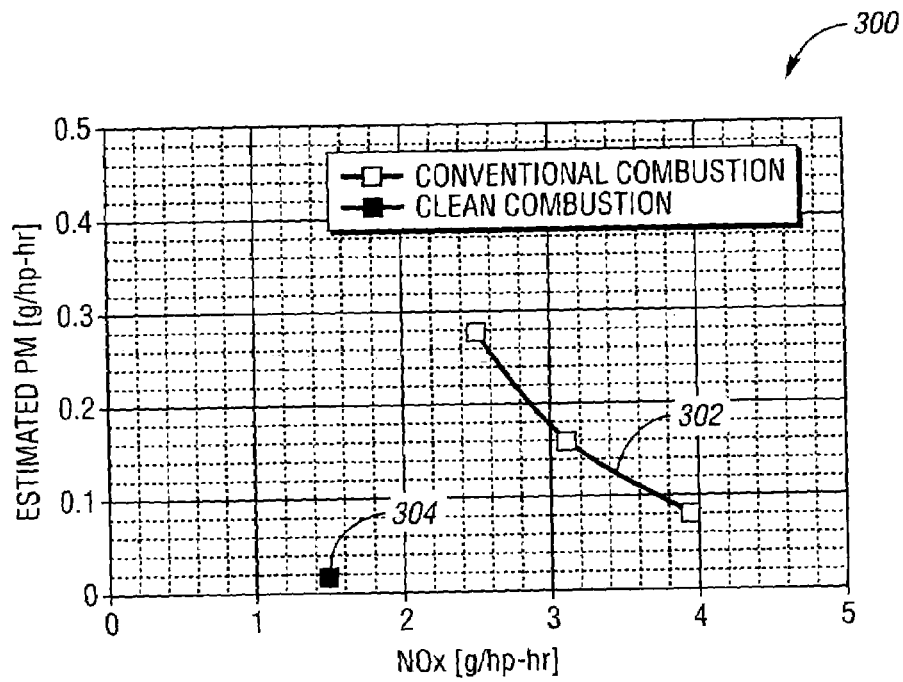
FIG. 5 is a diagram showing plots of simulated NOx and PM data for a conventional compression ignition engine and a compression ignition engine according to an embodiment of the present invention.

Referring to FIG. 5, a diagram 300 showing plots of simulated NOx and PM data for a conventional compression ignition engine (e.g., plot 302) and a compression ignition engine according to an embodiment of the present invention (e.g., plot 304) is shown. The diagram 300 generally illustrates that the present invention may provide simultaneous reduction in PM and NOx emissions.

Figure 6:
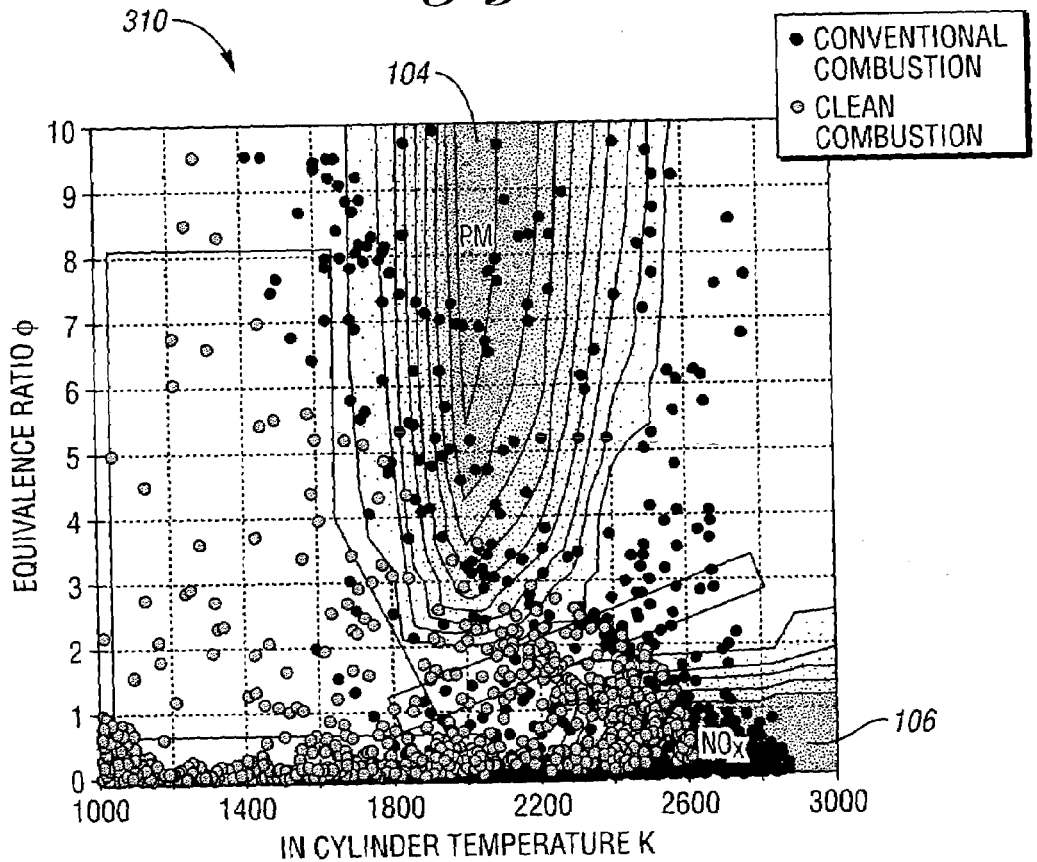
FIG. 6 is a diagram of multidimensional combustion simulation data at an instant of time corresponding to maximum heat release rate for a conventional compression ignition engine and a compression ignition engine according to an embodiment of the present invention.

Referring to FIG. 6, a diagram 310 of multidimensional combustion simulation data is shown. Each data point generally represents the equivalence ratio—in cylinder temperature characteristic of a small three-dimensional computational domain in a combustion chamber of the engine 100 at an instant of time corresponding to maximum heat release rate for a conventional compression ignition engine and a compression ignition engine according to an embodiment of the present invention. The present invention generally provides spatial distribution of local temperature and equivalence ratio substantially outside the regions that support NOx and PM formation (e.g., the regions 106 and 104, respectively) Specifically, in the embodiment of the invention corresponding to the data shown in FIG. 6, the peak in-cylinder temperature is reduced from 2800 K to 2600 K, the equivalence ratio under high temperature (2000 K to 2600 K) is limited to 2.0 or below, and the operating temperature is shifted at about 50% of the combustion space to 1700 K or less. The present invention may also enhance engine operation within the LTHE 12, LTLE 14 and IDTE 202 regions thus simultaneously reducing NOx and PM emissions.

Figure 7:
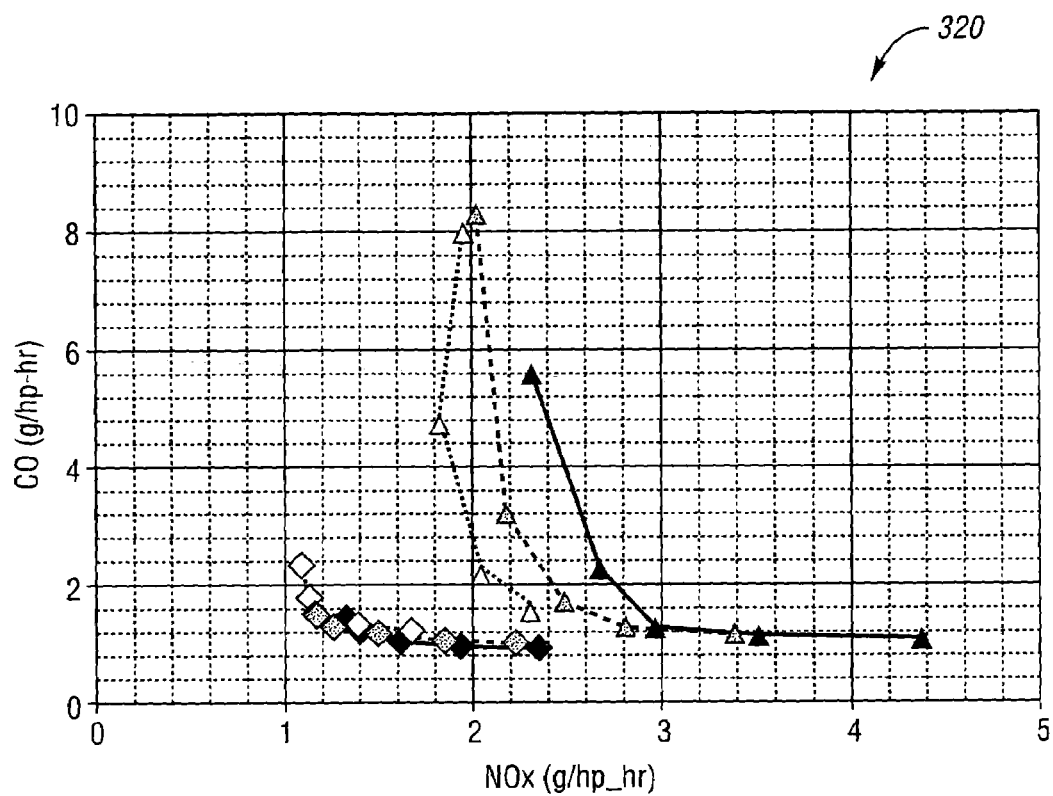
FIG. 7 is a diagram of engine test results illustrating control of CO emissions to predetermined levels while reducing NOx in a compression ignition engine according to an embodiment of the present invention.
Figure 8:
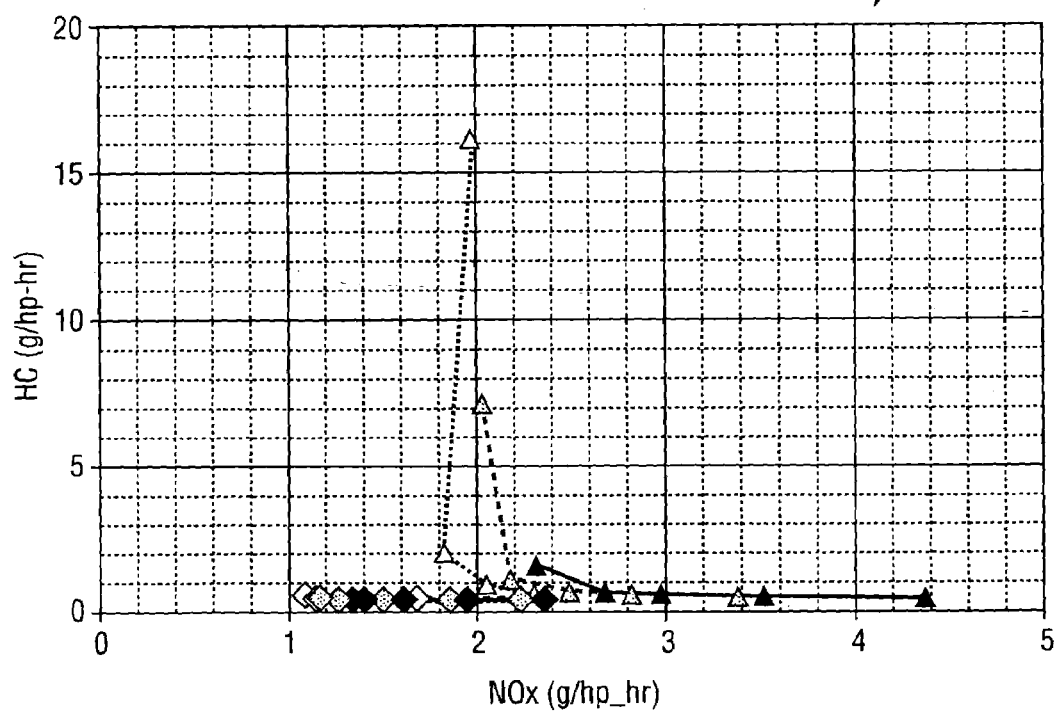
FIG. 8 is a diagram of engine test results illustrating control of HC emissions to predetermined levels while reducing NOx in a compression ignition engine according to an embodiment of the present invention.

Referring to FIGS. 7 and 8, diagrams 320 and 330 of engine test results illustrating the ability to control CO and HC emissions, respectively, to high or low levels as desired for aftertreatment application purposes while simultaneously reducing NOx emissions in a compression ignition engine according to an embodiment of the present invention are shown. In one embodiment, the CO and HC levels may be controlled to generate exotherms for increasing soot oxidation rates in a catalyzed DPF. In another embodiment, HC levels may be controlled to serve as the reductant in a platinum loaded DPF. However, the CO and HC levels may be controlled using the present invention to any level to meet the design criteria of a particular application.

Figure 9:
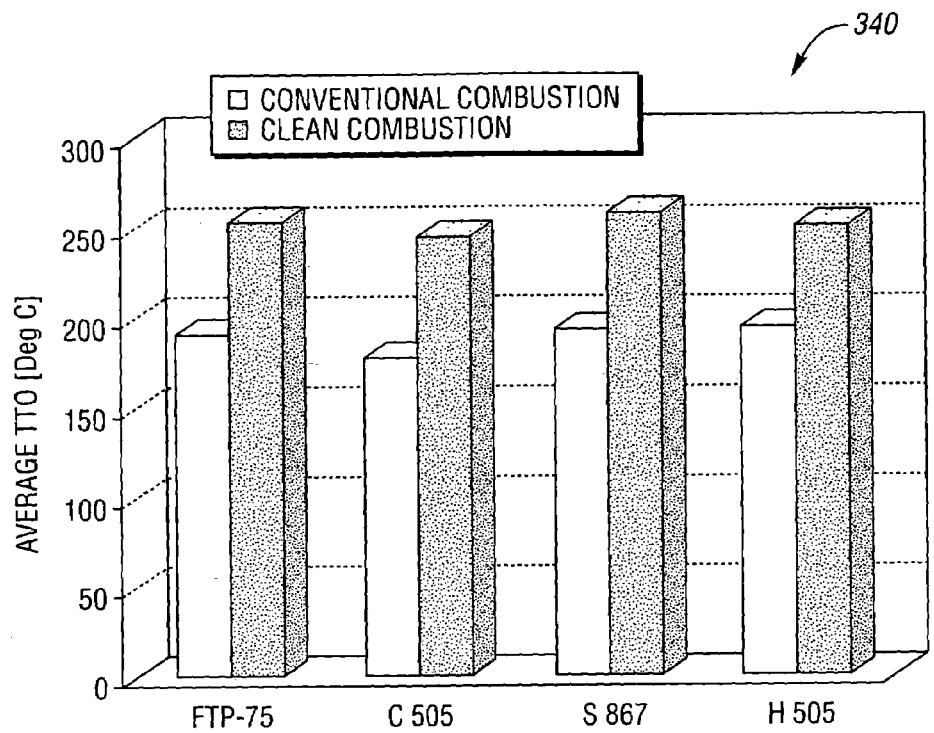
FIG. 9 is a diagram illustrating exhaust temperatures during portions of a transient test cycle for a conventional FTP-75 compression ignition engine and a FTP-75 compression ignition engine according to an embodiment of the present invention.

Referring to FIG. 9, a diagram 340 of test results for a compression ignition engine with conventional combustion techniques and a compression ignition engine implementing an embodiment of the present invention is shown. In general, the diagram 340 shows exhaust temperatures over various portions of a FTP-75 light duty engine transient test cycle (FTP-75, Cold 505, Stabilized 867, Hot 505). As illustrated in FIG. 9, the present invention may produce significantly higher exhaust gas temperature relative to conventional combustion techniques. In one embodiment of the present invention, the higher exhaust temperature may aid in DPF regeneration at idle and low cycle power conditions as exhaust temperatures of conventional compression ignition engines operating at idle and low power conditions are generally too low relative to the required light-off temperature for diesel oxidation catalysts.

Figure 10:
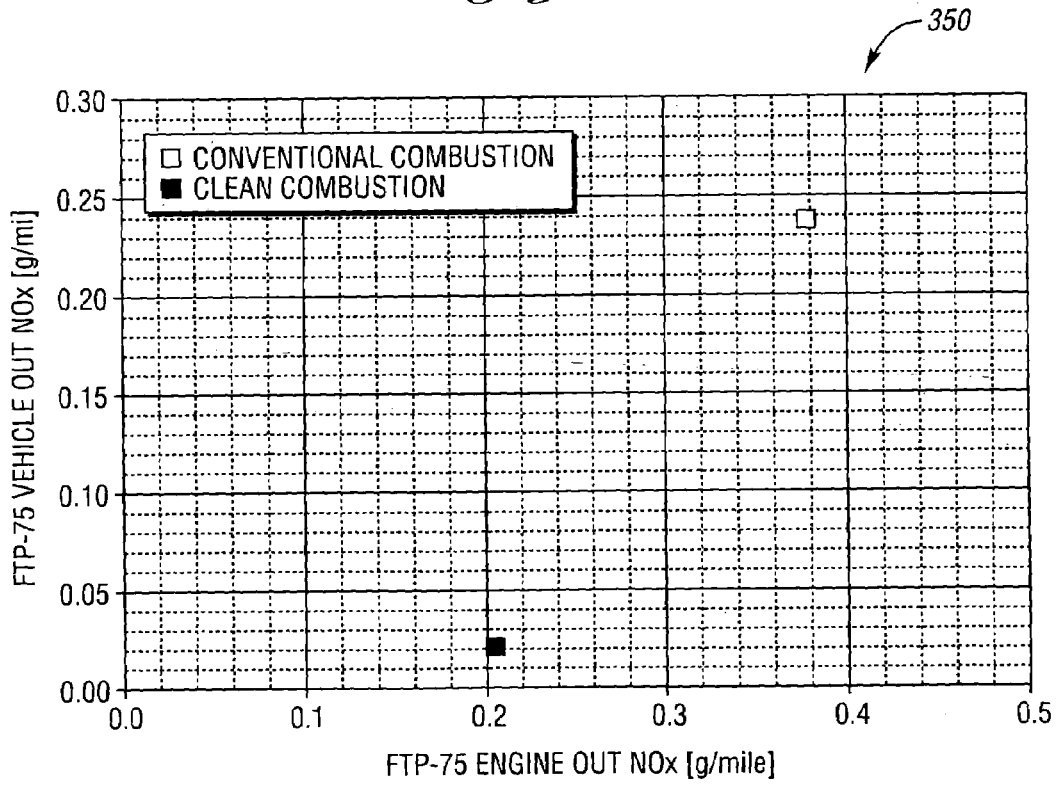
FIG. 10 is a diagram of test results illustrating levels of vehicle NOx emissions relative to engine NOx emissions for a conventional FTP-75 compression ignition engine and a FTP-75 compression ignition engine according to an embodiment of the present invention.

Referring to FIG. 10, a diagram 350 of test results over an FTP-75 engine transient cycle is shown. The data generally illustrates levels of engine-out and tailpipe-out (i.e., vehicle out) NOx emissions from a compression ignition engine running conventional combustion process in comparison with a compression ignition engine according to an embodiment of the present invention. As shown in FIG. 10, the present invention generally provides a reduction in engine-out NOx emissions (e.g., from approximately 0.38 g/mile to approximately 0.2 g/mile). In addition to engine-out NOx reduction capabilities, the present invention may enhance the effectiveness of post-combustion emissions treatment devices. As shown in FIG. 10, the enhanced effectiveness of post-combustion devices may reduce the tailpipe-out NOx emissions (e.g., from approximately 0.24 g/mile to approximately 0.03 g/mile).

As is readily apparent from the foregoing description, then, the present invention generally provides an improved apparatus and an improved method for controlling the emission of NOx and PM from compression ignition engines operating under light, medium, and/or heavy load conditions. Furthermore, the present invention generally enhances the effectiveness of conventional post-combustion emission treatment devices (i.e., after-treatment devices).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of reducing nitrogen oxides (NOx) and particulate matter (PM) in compression ignition engine emissions, the method comprising:

monitoring at least one engine sensor, wherein the at least one engine sensor generates a signal in response to at least one engine operating condition; and adjusting at least one engine control parameter in response to the signal such that in-cylinder spacial distribution of equivalence ratio and temperature is substantially maintained to an operating region, wherein the operating region corresponds to a set of equivalence ratio with respect to temperature values that are substantially outside regions supportive of NOx and PM formation, the temperature values are greater than 1650 K, and the equivalence ratio values are greater than 0.5.

2. The method of claim 1 wherein the at least one engine operating condition is at least one of engine speed, and engine torque.

3. The method of claim 1 wherein the at least one engine control parameter is at least one of fuel injection timing, exhaust gas recirculation (EGR) rate, EGR cooling, and number of fuel injection events per combustion cycle.

4. The method of claim 3 wherein the EGR rate is less than or equal to about 50 percent.

5. The method of claim 1 wherein the at least one engine control parameter is fuel injection timing, and the timing is controlled within a range of about 10 degrees Before Top Dead Center (BTDC) to about 15 degrees After Top Dead Center (ATDC).

6. The method of claim 1 further including the step of injecting fuel into an engine combustion chamber, wherein the fuel is injected at a pressure greater than or equal to about 500 bar.

7. The method of claim 1 further comprising the step of initiating multiple fuel injection events during a combustion cycle such that formation of at least one of carbon monoxide (CO) and hydrocarbon (HC) during the combustion cycle is maintained about a predetermined value.

8. The method of claim 1 wherein the at least one engine control parameter is adjusted such that engine in-cylinder combustion temperature is reduced with respect to a pre-adjustment engine in-cylinder combustion temperature.

9. The method of claim 1 wherein the at least one engine control parameter is adjusted such that homogeneity of fuel/air mixture is increased with respect to a pre-adjustment fuel/air mixture homogeneity.

10. The method of claim 1 wherein the at least one engine control parameter is adjusted such that combustion ignition is delayed with respect to timing of pre-adjustment combustion ignition.

11. A system for reducing nitrogen oxides (NOx) and particulate matter (PM) in vehicle emissions, the vehicle having a compression ignition internal combustion engine, the system comprising:

an exhaust gas recirculation (EGR) valve installed on the engine and having an actuator for adjusting EGR flow rate through the EGR valve in response to an EGR rate control signal;

a fuel injector valve installed on the engine and having an actuator configured to adjust fuel flow through the fuel injector valve in response to a fuel injector control signal;

a first sensor for determining engine speed;

a second sensor for determining engine torque;

a third sensor for determining vehicle speed; and an engine control module (ECM) in electrical communication with the EGR valve actuator, the fuel injector valve actuator, the first sensor, the second sensor, and the third sensor, wherein the ECM determines the EGR rate control signal and the fuel injector control signal in response to at least one signal presented by at least one of the first sensor, second sensor, and third sensor such that in-cylinder spacial distribution of equivalence ratio and temperature is substantially maintained to an operating region, the operating region corresponding to a set of equivalence ratio with respect to temperature values that are substantially outside regions supportive of NOx and PM formation, the temperature values are greater than 1650 K, and the equivalence ratio values are greater than 0.5.

12. The system of claim 11 further comprising an EGR cooler installed on the engine and having an actuator for adjusting EGR flow, through the cooler in response to an EGR cooling control signal, wherein the ECM determines the EGR cooling control signal in response to at least one signal presented by at least one of the first sensor, second sensor, and third sensor such that in-cylinder spacial distribution of equivalence ratio and temperature is substantially maintained to an operating region, the operating region corresponding to a set of equivalence ratio with respect to temperature values that are substantially outside regions supportive of NOx and PM formation, the temperature values are greater than 1650 K, and the equivalence ratio values are greater than 0.5.

13. The system of claim 12 wherein the ECM further comprises an ECM memory having a lookup table, and at least one of the EGR rate control signal, the EGR cooling control signal, and the fuel injector control signal is determined by referencing at least one value of at least one of the first sensor, the second sensor, and the third sensor to the lookup table.

14. The system of claim 12 wherein the ECM further comprises a microprocessor and a media, and the media is programmed with at least one mathematical model for determining at least one of the EGR rate control signal, the EGR cooling control signal, and the fuel injector control signal.

15. The system of claim 11 wherein the ECM determines the fuel injector control signal such that the fuel injector valve maintains fuel injection timing within a range of about 10 degrees Before Top Dead Center (BTDC) to about 15 degrees After Top Dead Center (ATDC).

16. The system of claim 11 further comprising an engine combustion chamber, wherein fuel is injected into the engine combustion chamber at a pressure greater than or equal to about 500 bar.

17. The system of claim 11 wherein the ECM determines the EGR rate control signal such that the EGR valve actuator maintains the EGR flow rate to a value less than or equal to about 50 percent.

18. The system of claim 11 wherein the ECM determines the fuel injector control signal such that the fuel injector valve initiates multiple fuel injection events during a combustion cycle, and formation of at least one of carbon monoxide (CO) and hydrocarbon (HC) during the combustion cycle is maintained about a predetermined value.

19. A controller for controlling exhaust nitrogen oxides (NOx) and particulate matter (PM) emissions from a compression ignition internal combustion engine, the controller comprising:
- a first output port that presents a first control signal to an exhaust gas recirculation (EGR) valve installed on the engine and having an actuator configured to adjust EGR flow rate through the EGR valve in response to the first control signal;
- a second output port that presents a second control signal to an EGR cooler installed on the engine and having an actuator configured to adjust EGR flow through the EGR cooler in response to the second control signal;
- a third output port that presents a third control signal to a fuel injector valve installed on the engine and having an actuator configured to adjust fuel flow through the fuel injector valve in response to the third control signal;
- a first input port that receives a first sensor signal from a respective sensor for determining engine speed;
- a second input port that receives a second sensor signal from a respective sensor for determining engine torque; and
- a third input port that receives a third sensor signal from a respective sensor for determining vehicle speed, wherein the controller is in electrical communication with the EGR valve actuator, the EGR cooler actuator, the fuel injector valve actuator, the sensor for determining engine speed, the sensor for determining engine torque, and the sensor for determining vehicle speed, and the controller determines at least one of the first control signal, second control signal, and third control signal such that in-cylinder spacial distribution of equivalence ratio and temperature is substantially maintained to an operating region, the operating region corresponding to a set of equivalence ratio with respect to temperature values that are substantially outside regions supportive of NOx and PM formation, the temperature values are greater than 1650 K, and the equivalence ratio values are greater than 0.5.

20. The controller of claim 19 wherein the controller determines the third control signal such that multiple fuel injection events are initiated during a combustion cycle and formation of at least one of carbon monoxide (CO) and hydrocarbon (HC) during the combustion cycle is maintained about a predetermined value.

* * * * *